United States Patent [19]
Akashi et al.

[11] 4,310,599
[45] Jan. 12, 1982

[54] MAGNETIC RECORDING ELEMENT

[75] Inventors: Goro Akashi; Masaaki Fujiyama, both of Odawara, Japan

[73] Assignee: Fuji Photo Film Co., Ltd., Minami-ashigara, Japan

[21] Appl. No.: 480,332

[22] Filed: Jun. 18, 1974

Related U.S. Application Data

[63] Continuation-in-part of Ser. No. 271,953, Jul. 14, 1972, abandoned.

[30] Foreign Application Priority Data

Jul. 14, 1971 [JP] Japan .................................. 46-52301

[51] Int. Cl.$^3$ ............................................. B32B 27/38
[52] U.S. Cl. .................................. 428/413; 428/423.7; 428/424.4; 428/424.8; 428/425.1; 428/425.9; 428/475.2; 428/476.9; 428/477.7; 428/479.3; 428/483; 428/508; 428/517; 428/518; 428/520; 428/694; 428/696; 428/702; 428/900
[58] Field of Search .................................. 117/235-240; 427/127-132; 428/900, 423.7, 424.4, 424.8, 425.1, 425.9, 475.2, 476.9, 477.7, 479.3, 483, 508, 517, 518, 520, 694, 696, 702

[56] References Cited

U.S. PATENT DOCUMENTS

| | | | |
|---|---|---|---|
| 2,761,791 | 9/1956 | Russell | 117/34 |
| 2,799,609 | 7/1957 | Dalton | 117/235 X |
| 2,804,401 | 8/1957 | Cousino | 117/235 |
| 3,293,066 | 12/1966 | Haines | 117/240 |
| 3,617,378 | 11/1971 | Beck | 117/235 |
| 3,733,215 | 5/1973 | Van Paesschen et al. | 117/239 X |
| 3,881,046 | 4/1975 | Akashi et al. | 428/469 |

OTHER PUBLICATIONS

Friedman et al., IBM Tech. Dis. Bull., vol. 9, No. 7, Dec. 66, p. 779.

Primary Examiner—Bernard D. Pianalto
Attorney, Agent, or Firm—Sughrue, Mion, Zinn, Macpeak & Seas

[57] ABSTRACT

A magnetic recording element comprising a magnetic recording layer on a surface of a synthetic resin support and an antistatic layer on the opposite surface of said synthetic resin support, wherein said antistatic layer comprises a powder of a white or light-colored pigment and a powder of a carbon type electrically conductive substance in a binder, said pigment powder being substantially all in the outer surface portion of said antistatic layer and said electrically conductive powder being substantially all in the portion of said antistatic layer adjacent said support is disclosed.

6 Claims, 1 Drawing Figure

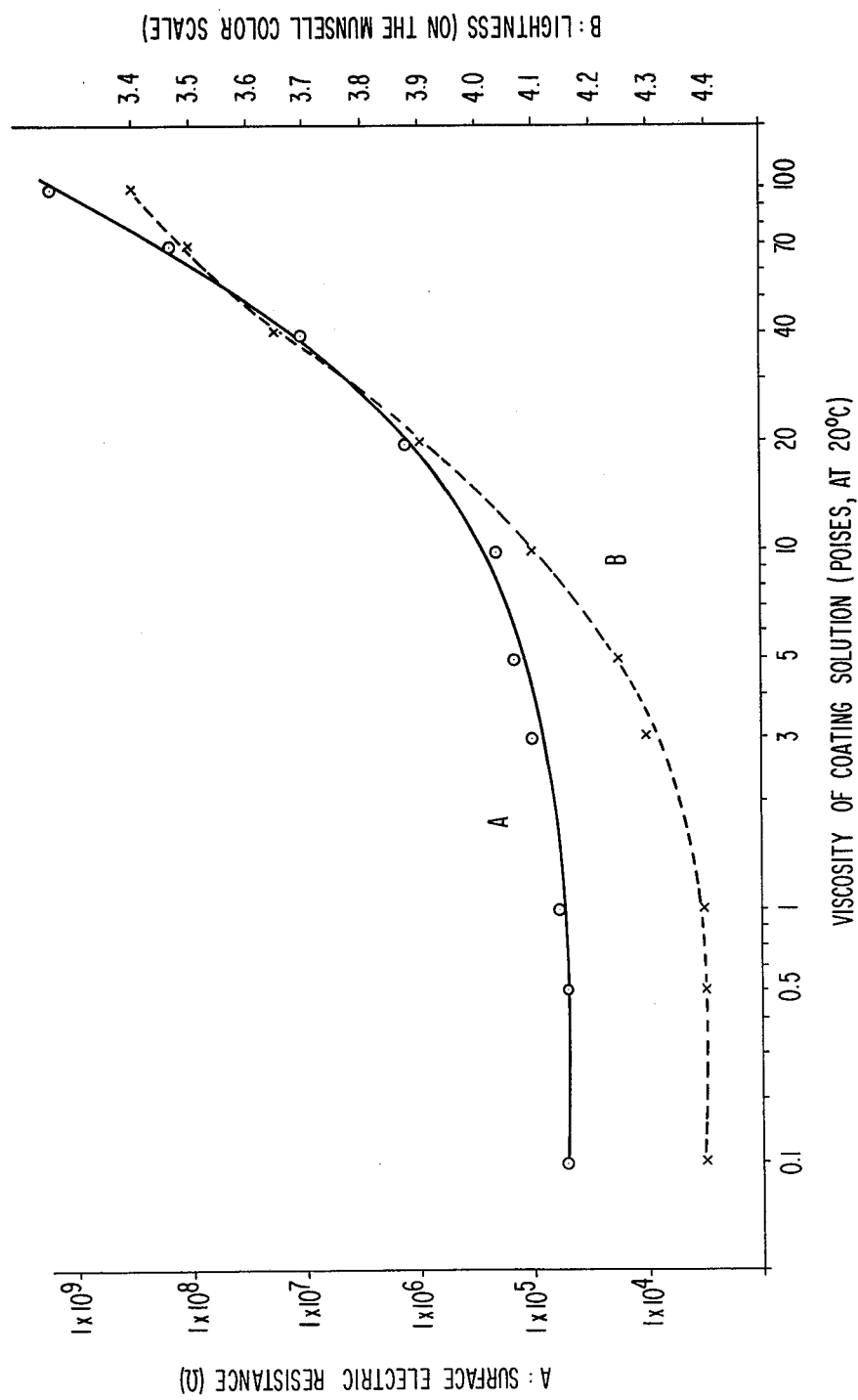

MAGNETIC RECORDING ELEMENT

CROSS-REFERENCE TO RELATED APPLICATIONS

This is a continuation-in-part application of parent application Ser. No. 271,953, filed July 14, 1972, entitled "Magnetic Recording Element", by Goro Akashi et al., abandoned.

BACKGROUND OF THE INVENTION

1. Field of the Invention

The present invention relates to a magnetic recording element. In more detail, the present invention relates to an antistatic layer on a magnetic recording element using a synthetic resin support.

2. Description of the Prior Art

As magnetic recording elements, there are many kinds of magnetic tapes such as a recording tape, a memory tape, a video tape and a tape for a tape recorder, etc., a cassette tape loaded in a cassette, a cartridge tape loaded in a cartridge, a magnetic card or magnetic sheet in which a sheet support is used, and a magnetic disk in which a plate support is used. The kinds of magnetic recording elements are too numerous to describe in detail. However, all of these have essentially a constitution comprising a magnetic layer of a ferromagnetic substance as the main component on a support.

Hitherto, may suggestions on inventions for improving the properties of the magnetic recording elements when they are in use have been made. One of these suggestions is to apply an antistatic layer to a magnetic recording element when the support is composed of synthetic resins, by which the adherence of dust electrostatically to the recording element is prevented. Another of these suggestions is to provide a magnetic recording element which has a surface which can be written with pencils or with pens using water-soluble or oil-soluble inks.

Based on the above, a magnetic recording element has been suggested which comprises a layer containing an electrically conductive substance on a subbing layer on the back of a support having thereon a magnetic layer, and a layer containing a white pigment on the layer containing the electrically conductive substance.

However, it is very difficult to apply such coating layers to the support so that the thickness of the layers is thin. Consequently, the production yield of the elements is lowered and the thickness of the magnetic recording element becomes remarkably large. For example, in the case of a tape, it is sometimes difficult to accommodate a tape having a desired length in a tape loading reel having a desired size. Accordingly, it is desirable to decrease the thickness.

On the other hand, provision of an ideal magnetic recording element in which the support itself is white or light-colored and electrically conductive has been considered. In this case, a powder of a white or light-colored pigment and a powder of an electrically conductive substance are added to the support. However, if the pigment is added in a large amount in order to improve the whiteness, the support tends to have insufficient electric conductivity, while if a powder of carbon black or graphite is added in a large amount in order to improve the electic conductivity, a dark color tends to result. Further, there is a restriction that the white pigment and the electrically conductive substance should be used in the amount within a range such that the strength (tensile strength) of the support is not below a desired value. Accordingly, it is impossible to produce such an ideal magnetic recording element at the present time. This is because a low-priced electrically conductive white pigment having a stable property has not been found yet.

SUMMARY OF THE INVENTION

Based on much research on coating layers for giving the above-described whiteness and electric conductivity to the synthetic resin support of a magnetic recording element, the present inventors have accomplished the present invention.

Namely, the present invention relates to a magnetic recording element having a magnetic recording layer on a surface of a synthetic resin support and an antistatic layer on the other surface of the synthetic resin support characterized in that the antistatic layer contains a powder of a white or light-colored pigment and a powder of a carbon type electrically conductive substance. The powder of the pigment is substantially all present in the outer surface part of the antistatic layer, and the powder of the electrically conductive substance is substantially all present in a part of the antistatic layer contacting the support.

DETAILED DESCRIPTION OF THE INVENTION

In the following the present invention is explained in greater detail.

As the support, there are, for example, moldings of synthetic resins, for example, polyesters such as polyethylene terephthalate, cellulose esters such as cellulose diacetate, cellulose triacetate, the polyvinylic polymers such as polyvinyl chloride and polyolefins such as polypropylene etc., which are in the shape of a tape, a card, a film or a plate. The magnetic layer comprising particles of a magnetic substance such as $\gamma$-$Fe_2O_3$, cobalt-containing ferrite, $CrO_2$, cobalt-containing $\gamma$-$Fe_2O_3$, cobalt-containing $Fe_3O_4$, Sb or Te containing $CrO_2$, alloy of Fe, Co, Ni, alloy of Co-Ni, alloy of Fe-Co-Cu, and $Fe_3O_4$ dispersed in a suitable binder such a vinyl-chloride vinyl acetate copolymer, polyamide resin, epoxy resin, nitro cellulose, polyurethane resin, copolymer of acrylonitrile-vinylidene chloride, copolymer of acrylonitrile and butadiene, etc., is applies to one surface of the support and the antistatic layer is applied to the opposite surface thereof. The preparation of the magnetic layer which does not constitute a part of the invention can be by any conventional technique, for example, as disclosed in *Magnetic Recording in Science and Industry*, Charles B. Pear, Jr., Ed., published by the Potter Instrument Co., N.Y. and in U.S. patents set forth hereinafter and can be carried out by anyone skilled in the art.

The predominant characteristic of the present invention is in the antistatic layer applied on the opposite surface of the support to the magnetic layer. This layer is applied to the support, if desired, after applying a subbing layer, for example, as disclosed in U.S. Pat. No. 3,215,554 and British Pat. No. 836,202. In the antistatic layer, the powder of the white or light-colored pigment and the powder of the carbon type electrically conductive substance are dispersed in a binder, in which the powder of the pigment is substantially all in the outer surface portion of the antistatic layer and the powder of the electrically conductive substance is substantially all in the inner portion of the layer contacting the support. In order to incorporate these two kinds of powders in the above-described omnipresent state, the above-described two kinds of powders are added to a coating solution for forming the antistatic layer and the resulting coating solution is applied only to a support or to a subbing layer.

A reason for this phenomenon, which at the present time has not been completely elucidated, is believed to be that the hydroscopic pigment powder causes convection currents in the coating layer just after application and the hygroscopic pigment powder accumulates at the surface portion by absorbing moisture in the air when it appears on the surface, while the carbon type substance remains in the interior portion of the coating layer because it does not have hygroscopic properties, by which the antistatic layer having the above-described structure is formed. Of course, it could function in many other ways. Suffice it to say, the hygroscopic pigment powder results at the surface portion and the carbon type substance results in the interior portion adjacent the support.

As the binder used in the antistatic layer, suitable binders are vinyl chloride-vinyl acetate copolymers, vinyl chloride-vinylidene chloride copolymers, epoxy resins, polyamide resins, acrylic acid ester resins, methacrylic acid ester resins, amino resins, phenol resins and polyurethane resins. These suitable resins are disclosed in British Pat. Nos. 979,527; 979,528; 982,665; 1,072,515; U.S. Pat. Nos. 3,098,761; 3,105,824; 3,149,995; 3,242,005; 3,247,017; 3,262,813; 3,284,223; 3,320,090; 3,357,855; 3,367,505; 3,397,178; 3,418,161; 3,437,510; 3,460,984; 3,472,798; 3,475,356; 3,484,286; 3,490,945; 3,499,789; 3,503,882; 3,505,109; 3,597,273; 3,630,771; 3,634,137; 3,634,185; and 3,650,828. As the white or light colored pigment, zinc oxide, titanium white and chrome yellow can be suitably used. As the carbon type electrically conductive substance, there are carbon black, graphite, etc. These can be used solely or as mixtures thereof. A suitable average particle size range for both the pigment and the carbon type electrically conductive substance can range from about 0.05 to $3\mu$, preferably from 0.1 to $2\mu$. These materials are used in an amount that the weight ratio of the carbon type electrically conductive substance to the white or light-colored pigment ranges from 20:1 to 1:20. The amounts of these materials can be adjusted so as to obtain the desired surface conductivity and whiteness (lightness) according to the kind of binder used. The surface electric resistance intended in the present invention is below $10^7$ ohms and the lightness intended is above 3.6 on the Munsell color scale. These values are limited only by provision of a good antistatic effect and the ability to have good discrimination for the markings and to see them easily in actual practice.

In order to satisfy these requirements of surface electric resistance and lightness on the Munsell color scale, the viscosity of the coating solution of the antistatic layer is less than 40 poises, more desirably 0.1 to 20 poises, and most desirably 0.5 to 10 poises at 20° C. The element other than the viscosity which affects the effects of the present invention is selection of solvents. The use of a mixture comprising different types of solvents shows remarkable effects in the present invention, i.e., the decrease in the surface electric resistance and the increase in the lightness. Solvents used are alcohols such as methanol, ethanol, butanol, amyl alcohol, octyl alcohol, benzyl alcohol, cyclohexanol, etc., ketones such as acetone, methylethyl ketone, diacetone alcohol, cyclohexanone, methyl cyclohexanone, etc., esters such as methyl acetate, ethyl acetate, butyl acetate, octyl acetate, cyclohexyl acetate, ethyl lactate, butyl lactate, glycol acetate, monoethyl ether, etc., ethers such as ether, glycol monomethyl ether, glycol dimethyl ether, glycol monoethyl ether, dioxane, etc., aromatic hydrocarbons such as benzene, toluene, xylene, etc.

Prior known additives can also be added to the coating solution for forming the antistatic layer so as to obtain other properties. For example, such additives can be lubricating agents such as silicone oils and fluorinated oils, plasticizers such as dioctyl phthalate and triphenyl phthalate, and lubricating agents such as stearic acid, palmitic acid and oleic acid. Examples of these additives are disclosed in U.S. Pat. Nos. 2,804,401; 3,007,807; 3,293,066; 3,398,011; 3,470,021; 3,476,596; 3,523,086; 3,625,760; 3,630,772; and 3,647,539. The kind and the amounts of these additives can be selected as the occasion demands.

The magnetic recording element of the present invention exhibits excellent antistatic effects and the back thereof can be written upon with a black pen. A very important feature of the invention is that the production of the magnetic recording element of the invention is advantageous because the number of coating layers is few, and consequently a sufficiently thin magnetic recording element can be obtained.

The invention will be explained in greater detail by reference to the following examples which are given for the purpose of illustration and are not to be interpreted as limiting the scope of the invention.

EXAMPLE 1

A coating solution was prepared by mixing 32.8 parts of a vinyl chloride-vinyl acetate copolymer as a binder component, 6.3 parts of oleic acid and 0.27 parts of a silicone oil (KF-96, produces by the Shinetsu Chemical Industry Co., Ltd.) as the lubricating agent, 150 parts of a titanium white powder as the white pigment and 18 parts of an acetylene black powder as the carbon type electrically conductive substance together with 220 parts of a solvent mixture of xylene-methylisobutylketone-butanol (weight mixing ratio: 5:3.5:0.5) in a ball mill for 48 hours, adding 27 parts of an epoxy resin (Epon #1001 produced by the Shell Chemical Company) and 36 parts of a polyamide resin (Tormide 210, produced by Fuji Kasei Co.), as a binder component, and adjusting the viscosity using the above-described solvent mixture so as to have a viscosity of 5-10 poises at 20° C.

This coating solution was applied to a surface of a polyethylene terephthalate support having a thickness of $25\mu$ which had been coated previously with a subbing layer of an amorphous polyester Vitel PE-207, a condensation product of isophthalic acid and butanediol, produced by the Goodyear Chemical Co., having a softening point of approximately 80° C. so as to have dry thickness of $5\mu$.

The thus resulting antistatic layer had a surface electric resistance of $2\times10^5$ ohms and a Munsell lightness value of 4.2 which means the antistatic layer had excellent properties.

EXAMPLE 2

Antistatic layers were formed in the same manner as described in Example 1 but using 300 parts of zinc oxide instead of 150 parts of a titanium white powder and 16 parts instead of 18 parts acetylene black and with the amount of the binder components (the vinyl chloride-vinyl acetate copolymer, the polyamide resin, the epoxy resin, the oleic acid and the silicone oil; the solvent mixing ratio was the same and the same materials were used as in Example 1) and the viscosity of the coating solution being varied. The results obtained when the surface electric resistance and the lightness of the antistatic layers were determined are shown in Table 1.

TABLE 1

| Sample | Binder Component (parts) | Viscosity (20° C.) (poises) | Surface Electric Resistance ($\times 10^5$) | Lightness |
| --- | --- | --- | --- | --- |
| 1 | 63 | 6.5 | 2.2 | 4.1 |
| 2 | 63 | 3 | 1.6 | 4.3 |
| 3 | 56 | 9 | 2.6 | 4.0 |
| 4 | 56 | 3 | 1.1 | 4.3 |
| 5 | 56 | 0.5 | 0.7 | 4.4 |
| 6 | 49 | 9 | 2.3 | 4.1 |
| 7 | 49 | 3 | 0.9 | 4.4 |
| 8 | 42 | 9 | 2.4 | 4.0 |
| 9 | 42 | 3 | 0.8 | 4.4 |

From the results shown in the above table, it can be seen that the amount of the binder component has little relation to the surface electric resistance and the lightness of the antistatic layer and that the lower the viscosity of the coating solution is, the lower the surface electric resistance is and the more the lightness increases. The antistatic layers obtained in this example were all excellent.

EXAMPLE 3

After mixing 32.8 parts of a vinyl chloride-vinylidene chloride copolymer as a binder component, 6.3 parts of oleic acid and 0.27 parts of the silicone oil described in Example 1 as the lubricating agent, 300 parts of zinc oxide as the white pigment and 28 parts of granular graphite as the carbon type electrically conductive substance in a ball mill for 48 hours together with 220 parts of the same solvent mixture as used in Example 1, 36 parts of the polyamide resin described in Example 1 and 27 parts of the epoxy resin described in Example 1 were added as binder components. Then the viscosity of the solution was adjusted to 2 poises at 20° C. by adding the solvent mixture described above. Thus prepared coating solution was applied to a polyethylene terephthalate film having a thickness of $25\mu$ so as to have a dry thickness of $5\mu$ to form an antistatic layer.

This antistatic layer had an electric resistance of $1.5 \times 10^5$ ohms and a Munsell lightness value of 4.3. With these values, markings using a black pencil or a black magnetic ink could be easily seen and a sufficient antistatic effect was obtained.

Then, a magnetic layer was applied so as to have a dry thickness of $13\mu$ using conventional techniques for producing a video tape. After treating the surface of the magnetic layer using a supercalender to give gloss, the medium was cut in tapes having a width of 2 inches (5.08 cm) to produce video tapes. When this video tape was used for recording and reproducing with a 4-head type video tape recorder for broadcasting (Ampex VR-2000), the withstand voltage was even below 5 V just after passing the rotary head.

On observation of each antistatic layer prepared above using a microscope in order to clarify why good results were obained on whitness (lightness) and the surface electric resistance of the antistatic layers on the magnetic recording elements obtained in each example it was found that in all samples the white pigment was essentially all present in the surface portion and the carbon type electrically conductive powder was omnipresent in the portion adjacent the support side.

EXAMPLE 4

A coating solution was prepared by dispersing 32.8 parts of a vinyl chloride-vinyl acetate copolymer as a binder component, 6.3 parts of oleic acid and 0.27 parts of a silicone oil as the lubricating agent, 150 parts of a titanium white powder as the white pigment and 18 parts of an acetylene black powder as the carbon type electrically conductive substance together with 220 parts of a solvent mixture of xylene-methylisobutylketone-butanol (weight mixing ratio: 5:3.5:0.5) in a ball mill for 48 hours, adding 27 parts of a epoxy resin and 36 parts of a polyamide resin as a binder component, and adjusting the viscosity using the above-described solvent mixture so as to have a viscosity of 1.0-100 poises at 20° C. The viscosity of the coating solution being varied is shown in Table II.

BRIEF AND DETAILED DESCRIPTION OF THIS FIGURE

This coating solution was applied to a surface of a polyethylene terephthalate support having a thickness of $25\mu$ which had been coated previously with a subbing layer of an amorphous polyester having a softening point of approximately 80° C. so as to have a dry thickness of $5\mu$ and further the above support was dried. The surface electric resistance and the lightness (on the Munsell color scale) of the antistatic layers were measured and found to be as shown in Table II and FIG. 1.

TABLE II

| Sample No. | Viscosity of the Coating Solution (poises at 20° C.) | Surface Electric Resistance (ohm) | Lightness (on the Munsell Color Scale) |
| --- | --- | --- | --- |
| i | 0.1 | $7 \times 10^4$ | 4.4 |
| ii | 0.5 | $7 \times 10^4$ | 4.4 |
| iii | 1 | $7.6 \times 10^4$ | 4.4 |
| iv | 3 | $1 \times 10^5$ | 4.3 |
| v | 5 | $1.5 \times 10^5$ | 4.25 |
| vi | 10 | $3 \times 10^5$ | 4.1 |
| vii | 20 | $1.1 \times 10^6$ | 3.9 |
| viii | 40 | $1 \times 10^7$ | 3.65 |
| ix | 70 | $1.5 \times 10^8$ | 3.5 |
| x | 100 | $2.2 \times 10^9$ | 3.4 |

From the results shown in the above table, it was clarified that when this antistatic layer had a surface electric resistance of less than $1 \times 10^7$ ohms and a Munsell lightness value of more than 3.6, the viscosity was 40 poises at 20° C.

While the invention has been described in detail and with reference to specific embodiments thereof, it will be apparent that various changes and modifications can be made therein without departing from the spirit and scope thereof.

What we claim is:

1. A magnetic recording element comprising a magnetic recording layer on a surface of a synthetic resin support and an antistatic layer on the opposite surface of said synthetic resin support which is a single layer consisting essentially of a powder of a hygroscopic inorganic white or light colored pigment and a powder of a carbon type electrically conductive substance in a binder, wherein said white or light-colored pigment powder is present in an amount of about 55 to 72 weight percent and said carbon-type electrically conductive powder is present in an amount of about 3 to 7 weight percent, said weight percents being based on the total weight of the ingredients in said antistatic layer, wherein said antistatic layer has been produced by coating the surface of said synthetic resin support with a coating solution of the powder comprising said layer having a viscosity less than 40 poises at 20° C. and then driving said coating, whereby the pigment powder is substantially all in the outer surface portion of said antistatic layer and said electrically conductive powder is substantially all in the portion of said antistatic layer adjacent said support and said antistatic layer has a surface resistance below $10^7$ ohms and a lightness of above 3.6 on the Munsell scale.

2. The magnetic recording element of claim 1, wherein said support is a molding of a polyester, a cellulose ester, a polyvinylic polymer or a polyolefin.

3. The magnetic recording element of claim 1, wherein black markings can be easily seen upon said element.

4. The magnetic recording element of claim 1, wherein said carbon type electrically conductive substance is carbon black, graphite or mixtures thereof.

5. The magnetic recording element of claim 1, wherein said binder is a vinyl chloride-vinyl acetate copolymer, a vinyl chloride-vinylidene chloride copolymer, an epoxy resin, a polyamide resin, an acrylic acid ester resin, a methacrylic acid ester resin, an amino resin, a phenol resin, or a polyurethane resin.

6. The magnetic recording element of claim 1, wherein said coating solution of the antistatic layer comprises at least two organic solvents selected from the group consisting of hydrocarbons, alcohols, ketones, esters and ethers.

* * * * *